United States Patent [19]

Armes et al.

[11] Patent Number: 4,959,162

[45] Date of Patent: Sep. 25, 1990

[54] COLLOIDAL POLYPYRROLE

[75] Inventors: Steven P. Armes, Los Alamos; Mahmoud Aldissi, Santa Fe, both of N. Mex.

[73] Assignee: The United States of America as represented by the United States Department of Energy, Washington, D.C.

[21] Appl. No.: 305,816

[22] Filed: Feb. 3, 1989

[51] Int. Cl.$^5$ .............................................. H01B 1/06
[52] U.S. Cl. .................................... 252/519; 252/500; 252/518; 526/258; 526/259; 524/435; 524/251; 524/438
[58] Field of Search ..................... 252/518, 519, 500; 526/259, 258; 524/435, 80, 251, 257, 401, 438

[56] References Cited

U.S. PATENT DOCUMENTS

| | | | |
|---|---|---|---|
| 4,818,646 | 4/1989 | Takakubo et al. | 252/518 |
| 4,835,076 | 5/1989 | Heinz et al. | 252/500 |
| 4,880,508 | 11/1989 | Aldissi | 252/500 |

*Primary Examiner*—Josephine Barr
*Attorney, Agent, or Firm*—Bruce H. Cottrell; Paul D. Gaetjens; William R. Moser

[57] ABSTRACT

Processable electrically conductive latex polymer compositions including colloidal particles of an oxidized, polymerized aromatic heterocyclic monomer, a stabilizing effective amount of a vinyl pyridine-containing polymer and dopant anions and a method of preparing such polymer compositions are disclosed.

19 Claims, No Drawings

COLLOIDAL POLYPYRROLE

FIELD OF THE INVENTION

The present invention relates to the field of conductive polymers, more particularly to the field of processable conductive polymers. This invention is the result of a contract with the Department of Energy (Contract No. W-7405-ENG-36).

BACKGROUND OF THE INVENTION

Conductive polymers have been widely investigated due to growing interest in their use in, e.g., anti-static coatings, conductive paints, electromagnetic shielding, electrode coatings and the like. Polypyrrole is a relatively air-stable conductive polymer which has previously been prepared by electrochemical methods (see, e.g., Kanazawa et al, J. Chem. Soc. Chem. Comm., 854 (1979)), and by chemical synthesis methods (see, e.g., Myers, J. Elec. Mat. 2, 61 (1986)). Polypyrrole latex particles have also been prepared by including certain polymers as polymeric surfactants often referred to as steric stabilizers, e.g., poly(vinyl alcohol-co-acetate), poly(vinylpyrrolidone), poly(acrylamide), poly(ethylene oxide) and methylcellulose.

Due to the widespread interest in the development of processable conductive polymers, research efforts were undertaken in the development of latex conductive polymer compositions.

Accordingly, it is an object of this invention to provide a processable electrically conductive latex polymer composition.

SUMMARY OF THE INVENTION

To achieve the foregoing and other objects and in accordance with the purposes of the present invention, as embodied and broadly described herein the present invention provides processable electrically conductive polymer compositions including: colloidal particles of an oxidized, polymerized aromatic heterocyclic monomer; a stabilizing effective amount of a vinyl pyridine-containing polymer; and dopant anions. In one embodiment of the invention, the processable electrically conductive polymer composition includes: colloidal particles of oxidized, polymerized pyrrole; a stabilizing effective amount of a vinyl pyridine-containing polymer selected from the group consisting of poly (2-vinyl pyridine), poly(3-vinyl pyridine), poly(4-vinyl pyridine), and copolymers of 2-, 3-, or 4-vinylpyridine and a hydrophobic, copolymerizable monomer; and dopant anions.

The present invention further provides dispersions of electrically conductive colloidal polymer particles including: a suitable dispersion medium; and, electrically conductive colloidal polymer particles comprising an oxidatively, polymerized aromatic heterocyclic monomer, a stabilizing effective amount of a vinyl pyridine-containing polymer, and dopant anions.

The present invention still further provides a process of preparing a processable electrically conductive polymer composition by oxidatively polymerizing a polymerizable aromatic heterocyclic monomer with a suitable oxidant in an aqueous-based medium including a stabilizing effective amount of a vinyl pyridine-containing polymer.

DETAILED DESCRIPTION

The present invention concerns processable electrically conductive polymer compositions and processes of preparing such compositions. An oxidative polymerization reaction is employed in the preparation of the conductive polymers of this invention. Such a reaction can be performed on a variety of oxidatively polymerizable monomers. Suitable oxidatively polymerizable monomers include aromatic heterocyclic compounds, such as pyrrole, N-substituted pyrroles, and beta-substituted pyrroles. The substituent groups may include alkyl, aryl, aralkyl, alkaryl, hydroxy, methoxy, chloro, bromo, and nitro groups. The substituent groups can be selected consistent with the desired polymerization conditions and the desired properties of the resultant polymer composition. Pyrrole is particularly preferred as the aromatic heterocyclic monomer.

By "processable" is meant that the electrically conductive polymer compositions have good film-forming characteristics and can be processed by conventional coating techniques.

The processable electrically conductive polymer compositions include a stabilizing effective amount of a vinyl pyridine-containing polymer. While not wishing to be bound any particular theory, it is believed that the vinyl pyridine-containing polymer functions as a steric stabilizer for the conductive polymer, e.g., polypyrrole, that is formed in the oxidative polymerization process, thereby preventing precipitation and resulting in colloidal particles of the polymer or a conductive latex polymer composition. The vinyl pyridine-containing polymer can be a homopolymer of a vinyl pyridine or can be a copolymer of a vinyl pyridine and a hydrophobic copolymerizable monomer. The vinyl pyridine can be 2-, 3-, or 4-vinyl pyridine, although 2-, and 4-vinyl pyridine are more commonly available. For example, the vinyl pyridine-containing homopolymer can be poly(2-vinyl pyridine), poly(3-vinyl pyridine) or poly(4-vinyl pyridine).

Suitable hydrophobic copolymerizable monomers for inclusion in the vinyl pyridine-containing polymer can include alkyl acrylates and alkyl methacrylates wherein the alkyl group contains at least one carbon atom, preferably from about one carbon atom to about five carbon atoms, most preferably from about three to about five carbon atoms. Such hydrophobic copolymerizable monomers can be included at levels of up to about 17 percent by weight in the vinyl pyridine-containing copolymers. Higher weight percentages of the hydrophobic copolymerizable monomers may also be used depending upon the particular monomers and the molecular weight of the resultant copolymer. The hydrophobic copolymerizable monomer can be ,for example, methyl acrylate, ethyl acrylate, propyl acrylate, butyl acrylate, pentyl acrylate, hexyl acrylate, heptyl acrylate, methyl methacrylate, ethyl methacrylate, propyl methacrylate, butyl methacrylate, pentyl methacrylate, hexyl methacrylate, heptyl methacrylate and the like. In such cases, the vinyl pyridine-containing polymer can be, e.g., poly(2-vinyl pyridine-co-butyl methacrylate), poly(3-vinyl pyridine-co-butyl methacrylate), poly(4-vinyl pyridine-co-butyl methacrylate), poly(2-vinyl pyridine-co-butyl acrylate), poly(3-vinyl pyridine-co-butyl acrylate), poly(4-vinyl pyridine-co-butyl acrylate), poly(2-vinyl pyridine-co-propyl methacrylate), poly(3-vinyl pyridine-co-propyl methacrylate), poly(4-vinyl pyridine-co-propyl methacrylate) and the like.

The hydrophobic copolymerizable monomer may also be a monomer such as $(CH_2-C(-OCOR)H)$ wherein R is an alkyl group of from about one to five carbon atoms, i.e., the monomer may be a material such as vinyl acetate, vinyl propionate, vinyl butyrate, or vinyl valerate, or a monomer such as ($CH_2$-C(-COOH)H), i.e., acrylic acid or the like.

By "latex" or "colloidal" is meant that the polymer composition forms particles having dimensions of from about 30 to about 500, more usually in the present polymer composition from about 100 to about 250 nanometers while remaining relatively uniformly dispersed throughout the particular dispersion medium. The polypyrrole particles are essentially spherical in nature.

The concentration of the vinyl pyridine-containing polymer in the polymerization reaction medium will vary with the choice of the steric stabilizing polymer, but should be a stabilizing effective amount. Generally, from about 0.4 to about 2.0 g of the vinyl pyridine-containing polymer per 100 ml of reaction medium will suffice as the stabilizing effective amount and prevent precipitation of, e.g., the conductive polypyrrole, to yield the conductive latex polymer composition. Below values of about 0.4 g, the stabilization effect can be too little to result in dispersed conductive colloidal particles and flocculation of the particles generally occurs.

The ratio of the vinyl pyridine-containing polymer to the aromatic heterocyclic monomer in the resultant product can generally vary from about 10/90 to about 25/75 by weight. While not wishing to be bound by any particular theory, it is believed that the homopolymer or copolymer is adsorbed onto the conductive colloidal polymer particles as they are formed.

The stabilizing effective amount of vinyl pyridine-containing polymer necessary to prevent precipitation of the conductive polymer can be reduced in some instances by addition of a minor amount of a proton-accepting material to the reaction medium. Suitable proton-accepting materials include pyridine, and may include other organic bases. For example, the addition of as little as one ml of pyridine to a reaction medium which includes poly(2-vinyl pyridine) as the stabilizing polymer can reduce the stabilizing effective amount of poly(2-vinyl pyridine).

The oxidant used in the oxidative polymerization process must be compatible with the vinyl pyridine-containing polymer and capable of oxidatively polymerizing the aromatic heterocyclic monomer. By "compatible" is meant that the combination of the oxidant and the vinyl pyridine-containing polymer does not result in the formation of significant insoluble precipitate in the reaction medium as the polymerization reaction is conducted. By "significant" is meant that whatever insoluble precipitate forms may be easily filtered off without adversely reducing the yield of conductive polymer composition. A preferred oxidant for the combination of pyrrole monomer and the like with vinyl pyridine-containing polymers is ferric chloride ($FeCl_3$). The result of oxidizing the aromatic heterocyclic monomer, e.g., pyrrole, with ferric chloride is that chloride ions remain as dopant anions in the resultant electrically conductive polymer composition. Other useful oxidants for the present invention may include other ferric salts.

The concentration of oxidant in the reaction medium can vary. Generally, the oxidant concentration will be from about 0.1 to about 0.5 molar. Preferably, the oxidant concentration is from about 0.2 to about 0.4 molar.

The reaction medium for the oxidative polymerization reaction is an acidic, aqueous medium. Generally, the pH of the reaction medium will be from about to 2, i.e., a hydrogen ion concentration of about $10^{-1}$ to $10^{-2}$ molar, although the reaction may be acomplished outside of this range. As the reaction proceeds the pH of the reaction medium will be reduced due to the production of hydrogen ions from the polymerization reaction of, e.g., pyrrole. The aqueous-based reaction medium may also contain organic solvent materials as long as such organic solvent materials are water-miscible and compatible with the oxidant, vinyl pyridine-containing polymer, and aromatic heterocyclic monomer. Examples of suitable organic solvents include alcohols such as methanol or ethanol, and pyridine.

The temperature of the reaction medium is typically room temperature, i.e., about 20° C., although the reaction may be accomplished at higher or lower temperatures if desired. The choice of temperature can depend on the solubility of the reactants and products at the particular temperature.

After the oxidative polymerization reaction is completed the resultant conductive colloidal polymer particles can be separated from the reaction medium, e.g., by centrifugation and decantation of the liquid. The conductive colloidal polymer particles, e.g., colloidal polypyrrole particles, can be redispersed in a dispersion medium such as water, methanol, and mineral acid, e.g., hydrochloric acid. The redispersion can be accomplished by ,e.g., use of ultrasonics. Generally, the dispersion medium may be any liquid in which the vinyl pyridine-containing polymer is soluble.

Pressed pellets prepared from the conductive colloidal polymer particles have solid-state conductivities from as high as about 0.4 to about 2.1 siemens per centimeter ($Scm^{-1}$). These high values are obtained despite the presence of the vinyl pyridine-containing polymer in the conductive composition. These conductivities have been found to slowly decrease with age of the sample.

A surprising feature of the conductive polymer compositions of the present invention is that they exhibit a reversible base/acid-induced flocculation-restabilization behavior. That is, the dispersed conductive colloidal polymer particles can be flocculated by addition of base, i.e., base sufficient to result in a pH of from about 3.6 to 5.2 or more and then redispersed or restabilized by addition of an acid to shift the pH back to about 3.6 to 5.2 or less. The pH necessary to flocculate the polymer compositions varies depending upon the particular stabilizing polymer. For example, compositions stabilized with the poly(4-vinyl pyridine co - butyl methacrylate) copolymer exhibit the flocculation-restabilization behavior at a pH of about 3.6 while compositions with the poly(2-vinyl pyridine-co-butyl methacrylate) copolymer exhibit such behavior at a pH of about 5.2. While not wishing to be bound by the present explanation, it is believed that this reversible behavior is related to the pyridine moities in the stabilizing polymer. Upon the addition of base, aggregation is believed to result from the deprotonation of the pyridine moities and a resultant decrease in the solubility of the vinyl pyridine-containing polymer. Addition of acid, then, results in the reprotonation of the pyridine moities and a resultant increase in the solubility.

In the preparation of the processable conductive polymer compositions of the present invention, the polymerizable aromatic heterocyclic monomer is added to an aqueous reaction medium containing a suitable oxidant, such as ferric chloride, for the aromatic heterocyclic monomer, and a stabilizing amount of a vinyl pyridine-containing polymer. The admixture is stirred at room temperature for a sufficient time to complete the reaction and the resultant conductive colloidal polymer particles separated and purified by means well known to those skilled in the art.

The present invention is more particularly described in the following examples which are intended as illustrative only, since numerous modifications and variations will be apparent to those skilled in the art.

EXAMPLE A

A copolymer of 2-vinyl pyridine and butyl methacrylate was prepared as follows: A reaction vessel equipped with addition funnels, heating means, and stirring means was charged with 100 milliliters (ml) of toluene and heated to reflux (about 60° C.). Butyl methacrylate (5.0 ml) and 2-vinyl pyridine (30.0 ml) were quickly added to the refluxing solvent, followed by addition of 0.05 gram (g) of 2,2'-azobisisobutyrolnitrile (AIBN) to the admixture. The admixture was then refluxed with stirring for 71 hours. The resultant copolymer was precipitated by addition of excess n-hexane. The solvents were poured off, the precipitate dissolved in methanol, and reprecipitated by addition of water. Purification was completed by repeated dissolving in 1,4-dioxan, followed by addition of water to reprecipitate. Finally, the copolymer was freeze-dried from dioxan.

EXAMPLE 1

A reaction vessel was charged with 100 ml of water, 1.20 g of a homopolymer of poly(4-vinyl pyridine) having an average molecular weight of about 200,000 (available from Scientific Polymer Products), and 5.47 g of ferric chloride. The admixture was stirred at room temperature as 1.00 ml of pyrrole was added. The admixture turned black and some film formation was observed in the reaction vessel within about 1-2 minutes. Colloidal formation and some minor precipitate was observed after about 5 minutes. Stirring was continued for about 23 hours, followed by centrifuging to remove the bulk of the water.

EXAMPLE 2

A reaction vessel was charged with 100 ml of water, 2.00 g of a homopolymer of poly(2-vinyl pyridine) having an average molecular weight of about 200,000 (available from Scientific Polymer Products) and 5.47 g of ferric chloride. A second reaction vessel was similarly charged with the exception that 3.00 g of the homopolymer was added. The admixtures were stirred at room temperature as 1.00 ml of pyrrole was added. The admixture containing 3.00 g of the homopolymer was observed to form a colloidal with no evidence of precipitate while the admixture with only 2.00 g of the homopolymer formed slight traces of precipitate along with colloidal formation.

EXAMPLE 3

A reaction vessel was charged with 100 ml of water, 1.20 g of the (2-vinyl pyridine) homopolymer as in Example 4 and 5.47 of ferric chloride. The admixture was stirred at room temperature as 1 ml of pyridine (a proton-accepting material) was added, following by addition of 1.00 ml of pyrrole. A black colloidal suspension formed with no evidence of any precipitate. The results of this run indicate that the addition of pyridine lowers the level of vinyl pyridine-containing polymer needed to avoid formation of precipitate.

EXAMPLE 4

A reaction vessel was charged with 100 ml of water, 1.00 g of the copolymer from Example A, and 5.47 g of ferric chloride. The admixture was stirred at room temperature as 1.00 ml of pyrrole was added. Stirring was continued for about 70 hours. The resultant colloidal particles were seperated from any excess stabilizing polymer and inorganic by-products by centrifuging at 15,000 rpm. The clear yellow-green supernatant was decanted from the black sediment. Latex powder was obtained by freeze drying from water. The conductivity of a pressed pellet of the latex powder was measured as 2.0 $Scm^{-1}$. A fraction of the polymer composition was redispersed in water and a film was deposited from the dispersion onto a glass slide by spin coating. The sample film exhibited similar conductivity to the pressed pellet. The result shows the processability of the conductive colloidal polymer compositions.

EXAMPLE 5

Two additional runs in the manner of Example 1 were completed using 0.75 g of the copolymer and 0.50 g of the copolymer respectively. The resultant conductivities were 1.2 $Scm^{-1}$ and 1.6 $Scm^{-1}$ respectively.

EXAMPLE 6

A reaction vessel was charged with 100 ml of water, 0.40 g of poly(4-vinyl pyridine-co-butyl methacrylate) having an viscoisity average molecular weight of about 405,000 (available from Scientific Polymer Products), and 5.47 g of ferric chloride. The admixture was stirred at room temperature as 1.00 ml of pyrrole was added. The admixture turned black and some precipitation was observed at the meniscus. A second run was then conducted in a similar manner except with 0.50 g of the copolymer. This admixture was stirred for about 24 hours without any observation of precipitation. A portion of the reaction solution (about 45 ml) was centrifuged at 5200 rpm and redispersed in water. The conductivity of the first run, wherein the percentage of the adsorbed copolymer was about 16%, was 2.0 $Scm^{-1}$. The conductivity of the second run, wherein the percentage of the adsorbed copolymer was about 19%, was 2.1 $Scm^{-1}$.

Although the present invention has been described with reference to specific details, it is not intended that such details should be regarded as limitations upon the scope of the invention, except as and to the extent that they are included in the accompanying claims.

What is claimed is:

1. A processable, electrically conductive polymer composition comprising:
   colloidal particles of from about 30 to about 500 nanometers of an oxidized, polymerized aromatic heterocyclic of an oxidized, polymerized aromatic heterocyclic monomer selected from the group consisting of pyrrole, N-substituted pyrrole, and beta-substituted pyrrole;
   a stabilizing effective amount of a vinyl pyridine-containing polymer selected from the group consisting of poly(2-vinyl pyridine), poly(3-vinyl pyridine), poly(3-vinyl pyridine), poly(4-vinyl pyridine), a copolymer of 2-vinyl pyridine and a hydrophobic copolymerizable monomer, a copolymer of 3-vinyl pyridine and a hydrophobic copolymerizable monomer, and a copolymer of 4-vinyl pyridine and a hydrophobic copolymerizable monomer, said amount effective to prevent precipitation of said electrically conductive polymer composition; and, dopant anions remaining from oxidant used in oxidatively polymerizing the aromatic heterocyclic monomer.

2. The composition of claim 1 wherein the aromatic heterocyclic monomer is pyrrole.

3. The composition of claim 1 wherein the vinyl pyridine-containing polymer is selected from the group consisting of poly(2vinyl pyridine), poly(3-vinyl pyridine), poly(4-vinyl pyridine), a copolymer of 2-vinyl pyridine and a hydrophobic copolymerizable monomer, a copolymer of 3-vinyl pyridine and a hydrophobic copolymerizable monomer, and a copolymer of 4-vinyl pyridine and a hydrophobic copolymerizable monomer.

4. The composition of claim 1 wherein the hydrophobic copolymerizable monomer is selected from the group consisting of alkyl acrylates or alkyl methacrylates wherein the alkyl group contains from about one to about five carbon atoms, acrylic acid, vinyl acetate, vinyl propionate, vinyl butyrate, or vinyl valerate.

5. The composition of claim 1 wherein the dopant anions are chloride ions.

6. The composition of claim 1 wherein the aromatic heterocyclic monomer is pyrrole, wherein the vinyl pyridine-containing polymer is poly(2-vinyl pyridine-co-butyl methacrylate) or poly(4-vinyl pyridine-co-butyl methacrylate), and wherein the dopant anions are chloride ions.

7. The composition of claim 1 further comprising a proton-accepting material said proton accepting material being pyridine.

8. The composition of claim 1 further comprising a dispersion medium.

9. The composition of claim 8 wherein the dispersion medium is selected from the group consisting of water, methanol, and mineral acid.

10. The composition of claim 3 wherein the hydrophobic copolymerizable monomer is selected from the group consisting of alkyl acrylates or alkyl methacrylates wherein the alkyl group contains from about one to about five carbon atoms.

11. A dispersion of electrically conductive particles comprising:
a suitable dispersion medium; and
electrically conductive colloidal particles of from about 30 to about 500 namometers of an oxidatively, polymerized aromatic heterocyclic monomer selected from the group consisting of pyrrole, N-substituted pyrroles and beta-substituted pyrroles, a stabilizing effective amount of a vinyl pyridine-containing polymer selected from the group consisting of poly(2-vinyl pyridine), poly(3-vinyl pyridine), poly(3-vinyl pyridine), poly(4-vinyl pyridine), a copolymer of about 2-vinyl pyridine and a hydrophobic copoplymerizable monomer, a copolymer of 3-vinyl pyridine and a hydrophobic copolymerizable monomer, and a copolymer of 4-vinyl pyridine and a hydrophobic copolymerizable monomer, said amount effected to prevent precipitation of said electrically conductive polymer composition, and dopant anions.

12. The dispersion of claim 11 wherein the dispersion medium is water, methanol, or mineral acid.

13. The dispersion of claim 11 further including a proton-accepting material said proton accepting material being pyridine.

14. A process of preparing a processable electrically conductive polymer composition comprising:
oxidatively polymerizing an aromatic heterocyclic monomer selected from the group consisting of pyrrole, N-substituted pyrroles, and beta-substituted pyrroles, in an aqueous reaction medium, the aqueous reaction medium including a oxidant for the aromatic heterocyclic monomer, and a stabilizing effective amount of a vinyl pyridine-containing polymer selected from the group consisting of poly(2-vinyl pyridine), poly(3-vinyl pyridine), poly(4-vinyl pyrdine), and copolyumers of 2-, 3-and 4-vinyl pyridine and a hydrophobic copolymeizable monomer, said amount effective to prevent precipitation of said electrically conductive polymer composition.

15. The process of claim 14 wherein the vinyl pyridine-containing polymer is selected from the group consisting of poly(2-vinyl pyridine), poly(3-vinyl pyridine),poly(4-vinyl pyridine), and copolymers of 2-, 3-and 4-vinyl pyridine and a hydrophobic copolymerizable monomer.

16. The process of claim 15 wherein the hydrophobic copolymerizable monomer is selected from the group consisting of alkyl acrylates or alkyl methacrylates wherein the alkyl group contains from about one to about five carbon atoms, acrylic acid, vinyl acetate, vinyl propionate, vinyl butyrate, or vinyl valerate.

17. The process of claim 14 wherein the oxidant is ferric chloride.

18. The process of claim 14 wherein the aromatic heterocyclic monomer is selected from the group consisting of pyrrole, N-substituted pyrroles, and beta-substituted pyrroles.

19. The process of claim 14 wherein the aromatic heterocyclic monomer is pyrrole.

* * * * *